United States Patent Office 3,205,229
Patented Sept. 7, 1965

3,205,229
NOVEL CHLOROCYANURATE COMPOSITIONS
AND PROCESSES OF PREPARING SAME
Edwin A. Matzner, St. Louis, Mo., assignor to Monsanto
 Company, a corporation of Delaware
No Drawing. Filed Mar. 7, 1962, Ser. No. 177,990
3 Claims. (Cl. 260—242)

The novel compounds of this invention and compositions containing such compounds, and processes for preparing such compounds were disclosed in part in my copending application, for Letters Patent Serial No. 838,038, filed September 4, 1959, now abandoned. The disclosure contained in the present application should be taken in conjunction with said application for Letters Patent Serial No. 838,038 and considered as a continuation in part of said appliction.

This invention relates to zinc di(dichlorocyanurate), including zinc di(dichloroisocyanurate) and hydrates thereof. This invention more particularly relates to novel formulations containing these compounds, and to novel processes for preparing these compounds.

Zinc di(dichloroisocyanurate) and hydrates thereof which salts can be represented structurally as

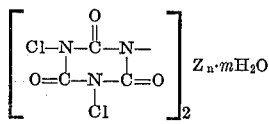

wherein $m$ is an integer in the range of from 0 to 10, inclusive, preferably 0 to 6 inclusive, are useful sources of available chlorine in bleaching, oxidizing, disinfecting, sterilizing and/or detergent formulations. All of these salts are white solids exhibiting moderate water-solubility. Examples of these salts include anhydrous, amorphous zinc di(dichloroisocyanurate), and crystalline zinc di(dichloroisocyanurate) trihydrate, tetrahydrate and the hexahydrate. Although the formula for the above compound is represented structurally as being in the keto or isoform it is to be understood that these compounds may also exist in the enol form or as mixtures of the enol and keto or iso forms. The term zinc di-(dichlorocyanurate) as used herein and in the appended claims is intended to include either one of these forms or mixtures thereof.

The compounds of this invention can be prepared by reacting an aqueous solution containing from about 3.0% to 80% by weight of a water soluble zinc salt as for example the chloride, bromide, sulfate, and acetate salts of zinc, preferably zinc chloride, and an aqueous solution containing at least 5% by weight of sodium, lithium or cesium dichlorocyanurate in a reaction zone at a temperature in the range of from about 5° C. to about 60° C. The zinc salt and such dichlorocyanurate are preferably employed in a molar ratio of about 1:2. The product, which precipitates from the aqueous reaction system, is a hydrate of zinc di(dichloroisocyanurate) which can be dehydrated to lower hydrates or to the amorphous anhydrous salt by any of the well known means for removing water of hydration from hydrates.

The aqueous solution of the water soluble zinc salt, containing from about 3.4% to about 80% by weight of the salt, is preferably at least a 0.3 molar, and, more preferably, is a 1.0 to 3.0 molar, solution of the water soluble zinc salt. The aqueous solution of the sodium, lithium, or cesium dichlorocyanurate is preferably a saturated solution but may be a 0.6 to 0.9 molar solution of such dichlorocyanurate. If the molar concentration of the water soluble zinc salt is less than 0.2 molar, no precipitate will be formed in the aqueous reaction system, and since no solid zinc di(dichlorocyanurate) is formed such salt can not be separated from the aqueous reaction system.

The aqueous solutions of the water soluble zinc salt and such dichlorocyanurate in the above described concentration ranges are preferably brought together and reacted in a reaction zone in a manner such that an aqueous medium having a pH in the range of from about 4.5 to about 6.5 is formed. This can be usually accomplished in several ways, for example the aqueous solutions can be added to the reaction zone simultaneously with agitation, preferably by mechanical means and at a rate such as to provide a pH in the range of from about 4.5 to 6.5, preferably a pH in the range of from about 5.0 to about 6.0, in the aqueous medium in the reaction zone. Alternatively, the aqueous dichlorocyanurate solution can be charged to a reaction vessel and the aqueous solution of water soluble zinc salt added thereto until the pH falls to about pH 4.5. At this pH substantially all of the dichlorocyanurate has reacted with the zinc salt form zinc di-(dichlorocyanurate). In all instances the reaction zone is suitably maintained at a temperature in the range of from about 5° C. to about 60° C.

By so proceeding there is formed in the reaction zone an aqueous reaction mixture comprising an aqueous slurry of a crystalline hydrate of zinc di-(dichlorocyanurate) dispersed in an aqueous phase containing (preferably consisting essentially of) an aqueous solution of the sodium, lithium, or cesium salt of the anion of the water soluble zinc salt employed as the initial reactant. For example such anion is preferably the chloride anion, but may be a sulfate, bromide, acetate, etc. anion. The crystalline hydrate of zinc di(dichlorocyanurate) may then be readily separated from the reaction mixture by well known means such as filtration, centrifugation, sedimentation decantation and the like.

If the pH of the aqueous medium in the reaction zone falls or is permitted to fall below substantially pH 4.5 a significant quantity of dichlorocyanuric acid is generally formed and product yield is not only diminished but the product is also contaminated with such acid which is difficult to separate from the desired product. On the other hand, if the pH of the aqueous medium in the reaction zone rises or is permitted to rise above about pH 6.5 a portion of the sodium, lithium or cesium dichlorocyanurate remains unreacted in the reaction zone, resulting in a lower yield of the crystalline hydrate of zinc di(dichlorocyanurate).

Although the compounds of this invention may also be prepared by adding the solution of alkali metal dichlorocyanurate to a reaction vessel or reaction zone containing the aqueous solution of the water-soluble zinc salt there is the disadvantage of formation (in the aqueous reaction mixture in the reaction zone) of a mixture of solid dichlorocyanuric acid and solid crystalline hydrate of zinc di(dichlorocyanurate) resulting in a lower product yield and necessitating the removal of the dichlorocyanuric acid from the mixed solids. As indicated, the separation of the acid from such hydrate is difficult, costly and results in lower yield of the hydrate. Attempts have presently been made to prepare the compounds of this invention by reacting a water soluble zinc salt with various alkali metal dichlorocyanurates, dichlorocyanuric acid or trichlorocyanuric acid. However, it has been found that substantially no reaction occurs when water soluble zinc salts are reacted with dichlorocyanuric acid. On the other hand, when water soluble zinc salts are reacted with trichlorocyanuric acid a reaction occurs in which dichlorocyanuric acid is formed. Even more surprisingly it has been found that when water soluble zinc salts are reacted with alkali metatl dichlorocyanurate such as potassium dichlorocyanurate, a reaction takes place in which zinc di(dichlorocyanurate) is not formed but an unknown compound, which is not potassium dichlorocyanurate or zinc di(dichlorocyanurate) or dichlorocyanuric acid or trichlorocyanuric acid, is formed. A similar result (as that encountered with the use of potassium dichlorocyanurate) is obtained when the alkali metal salt rubidium dichlorocyanurate is reacted with a water soluble zinc salt.

It has presently been found that the compounds of this invention can be prepared only by reacting an aqueous solution of a water soluble zinc salt such as zinc chloride or zinc sulfate with a solution of either sodium, lithium or cesium dichlorocyanurate under the conditions hereinbefore described when the proper concentrations of the reactants as hereinbefore described are employed. It has been found particularly advantageous in preparing the compounds of this invention to react an aqueous solution of zinc chloride and a saturated solution of sodium dichlorocyanurate using the concentrations of each reactant as hereinbefore described. Under the usual conditions of reaction described herein solid particles of crystalline zinc di(dichlorocyanurate) trihydrate are formed as a slurry in the aqueous phase of the reaction mixture in the reaction zone. After separating this product from the bulk of the aqueous phase of the reaction mixture it has been found possible to obtain amorphous anhydrous zinc di(dichlorocyanurate) by heating the crystalline trihydrate at a temperature below the temperature at which the trihydrate loses appreciable chlorine, for example, a temperature of from about 110° C. to about 140° C. for from 30 minutes to 4 hours, the lower temperatures requiring the longer heating periods.

In addition to the crystalline zinc di(dichlorocyanurate) trihydrate formed in the above process, higher crystalline hydrates such as the hexa- and octa-hydrate may sometimes be formed. Such higher hydrates are generally unstable and revert to the more stable trihydrate, during the processes of this invention.

As illustrative of the preparation of the salts of this invention is the following.

EXAMPLE I

To a suitable reaction vessel equipped with a thermometer and agitator was added 440 grams of sodium dichloroisocyanurate in the form of a saturated aqueous solution thereof. To the solution over a period of about 15 minutes was added a solution of 150 grams of zinc chloride in 50 grams of water while maintaining the temperature of about 20° C. Upon completion of the zinc chloride addition the reaction mass was agitated for about one hour, cooled to about 10° C. and thereafter filtered. (The pH of the filtrate was 5.8). The filter cake was then dried for several hours at room temperature. The dried product was a white solid containing 10.5 percent by weight of hydration and identified as the trihydrate of zinc di(dichloroisocyanurate). This solid is characterized by an available chlorine content of 53.9%.

X-ray diffraction analysis of the trihydrate of zinc di(dichloroisocyanurate) revealed the following principal lines (relative intensities greater than 20%).

| Interplanar spacing: | Relative intensity |
|---|---|
| 3.36 | 100 |
| 4.06 | 95 |
| 5.82 | 61 |
| 5.57 | 46 |
| 8.04 | 42 |
| 2.86 | 35 |
| 2.58 | 30 |
| 2.66 | 30 |
| 3.26 | 27 |
| 2.49 | 27 |
| 2.52 | 27 |
| 3.54 | 26 |
| 2.79 | 23 |
| 2.38 | 21 |

X-ray diffraction analysis of the trihydrate of zinc di(dichloroisocyanurate) revealed the following principal lines having relative inensities less than 20%.

| Interplanar spacing: | Relative intensity |
|---|---|
| 4.23 | 15 |
| 5.01 | 14 |
| 3.64 | 14 |
| 3.15 | 12 |
| 2.76 | 12 |
| 2.60 | 12 |
| 2.47 | 10 |
| 2.26 | 8 |
| 2.24 | 8 |
| 2.56 | 7 |
| 3.78 | 6 |
| 2.92 | 6 |
| 2.84 | 6 |
| 2.32 | 6 |
| 2.18 | 5 |
| 2.16 | 5 |
| 2.03 | 5 |
| 2.08 | 4 |

The trihydrate of zinc di(dichloroisocyanurate) of Example I on drying in air-circulating oven at 120° C. for 2-3 hours yielded anhydrous white solid zinc di(dichloroisocyanurate) which was characterized by an available chlorine content of 59.2% and a zinv content determined by ignition, of 13.8%. Unlike the trihydrate which is a crystalline compound, the anhyrous zinc di(dichlorocyanurate) is an amorphous compound.

EXAMPLE II

To a 2.5 liter glass reaction vessel equipped with a thermometer, agitator, pH electrodes and an ice bath for controlling the reaction temperature there was charged 200 ml. of an aqueous solution containing 15% by weight of sodium dichlorocyanurate. Thereafter there was continuously added to the reaction vessel 4370 grams of sodium dichlorocyanurate in the form of a 15% by weight aqueous solution thereof. Simultaneously and continuously with the addition of the aqueous sodium dichlorocyanurate, 1500 grams of zinc chloride, in the form of an aqueous solution containing 50% by weight of zinc chloride, was added to the reaction vessel at a rate and with sufficient agitation to efficiently mix the reagents and to maintain a pH of 5.7±0.2 in the reaction vessel. Throughout the addition of the respective reagents the reaction mixture in the reaction vessel was maintained at a temperature of about 25° C'±2° C. Almost immediately with the simultaneous addition of the reagents a crystalline precipitate, later identified as crystalline zinc di(dichlorocyanurate) trihydrate was formed as an aqueous slurry in the aqueous reaction mixture.

A substantially constant volume of 2 liters of the reaction mixture was maintained in the reaction vessel by continuously removing a portion of the aqueous slurry, having crystals of zinc di(dichlorocyanurate) trihydrate dispersed therein, by means of a suction pump. The sojourn time of the reaction product in the reaction vessel was about 5 minutes. The slurry so removed which consisted of crystalline zinc di(dichlorocyanurate) trihydrate dispersed in an aqueous solution of sodium chloride was removed by filtration. The filter cake thus formed was washed with water (which had been cooled to a temperature of 5° C.) to remove residual sodium chloride. The filter cake which contained about 45% water was dried to 50° C. to constant weight. The product so obtained was a white, crystalline solid.

Upon completion of the above continuous run a yield of 4843 grams, or 94.4% of the yield theoretically possible, of the white crystalline solid was obtained. Upon analysis the crystalline solid was found to contain 12.6% water as water of hydration, 54.2% available chlorine and 12.8% of zinc. The water of hydration, available chlorine and zinc content corresponded to zinc di(dichlorocyanurate) trihydrate which theoretically has a water content of 12.5% and available chlorine content of 55% and contains 12.9% zinc.

When the above procedure was repeated and zinc sulfate was substituted for zinc chloride, zinc di(dicholorocyanurate) trihydrate was obtained in a yield of 94.2% of that theoretically possible. On the other hand when zinc carbonate (which is substantially insoluble) or zinc oxide were substituted in the aforementioned process substantially no zinc di(dichlorocyanurate) was formed and no reaction occurred.

EXAMPLE III

A five-hundred thirteen gram sample of the crystalline zinc di(dichlorocyanurate) trihydrate obtained in Example II was placed in an air circulating oven maintained at a temperature of 120° C. and dried to constant weight. A drying time of 4 hours was required. At the end of this period the zinc di(dichlorocyanurate) had lost its crystalline character and had become a white amorphous appearing solid which weighed 458.2 grams. X-ray diffraction analysis did not yield a diffraction pattern thus confirming the amorphous quality of the material.

An available chlorine analysis showed that this product contained 61% available chlorine contrasted with the theoretical 62% available chlorine value for the anhydrous compound. A zinc analysis revealed that the product contained 14.2% of zinc in contrast to the 14.4% theorectical zinc content.

It was unexpected that the anhydrous zinc di(dichlorocyanurate) would prove amorphous particularly in view of the crystalline character of other known anhydrous metal dichlorocyanurates.

The compounds of the present invention are unsually stable in the presence of those neutral and alkaline inorganic compounds ordinarily employed in bleach and detergent composition.

Examples of such inorganic compounds are phosphates, such as di- and trisodium orthophosphates, sodium acid pyrophosphate, tetrasodium pyrophosphate, sodium tripolyphosphate, sodium metaphosphates, such as trimetaphosphates, hexametaphosphates, Graham's salts, etc.; silicates such as the meta, ortho, di, and tetra silicates; carbonates; aluminates; sulfates, chlorides, oxides, sulfides, etc. While the alkali and alkaline earth metal compounds, such as the sodium potassium, lithium, calcium, barium, etc. analogues of the foregoing are the most commonly used compounds in detergents and bleach compositions, it should be recognized that the polyvalent metal compounds, such as the aluminum, iron, titanium, etc. salts, oxides and the like can also be used in combination with the available chlorine compounds of this invention.

The inorganic compounds used in combination with the novel chlorine compounds of this invention can be either water-soluble or water-insoluble, depending upon the particular purpose for which the combination is designed. For example, the water-soluble polyphosphates (including pyrophosphates) are often used as sequestering agents in bleaching formulations; the polyphosphates, silicates, carbonates and sulfates are often used as builders, corrosion inhibitors, diluents, etc. in detergent formulations. Insoluble compounds, such as dicalcium orthophosphate, calcium carbonate, calcium sulfate titanium dioxide, silia, etc., may be used as abrasive agents in scouring powders or other grinding or polishing operations.

Zinc di(dichloroisocyanurate) and hydrates thereof are also unique in their outstanding stability in the presence of organic compounds. This property is particularly useful in that it permits the use of these zinc salts in formulations which contain perfumes or odor masking agents such as essential oils or various components thereof; organic sequestering and chelating agents such as the metal salts of ethylene diamine tetra-acetic acid; organic dyes and coloring agents such as those described in Venkataraman, "Chemistry of Synthetic Dyes," Academic Press, Inc., New York (1952); organic stain, corrosion or tarnish inhibitors such as those described in U.S. Patents 2,618,603 and 2,618,615. The compounds of this invention are also unique with respect to stability when combined with organic surface active agents such as foaming agents, emulsifiers, detergents and the like. Examples of organic surface active agents include anionic surfactants such as sulfated and sulfonated alkyl, aryl, and alkyl hydrocarbons and alkali metal salts thereof, for example, sodium salts of long chain alkyl sulfates, sodium salts of alkyl naphthalene sulfonic acids, sodium salts of sulfonated abietenes, sodium salts of alkyl benzene sulfonic acids, particularly those in which the alkyl group contains from 8–24 carbon atoms, sodium salts of sulfonated mineral oils and sodium salts of sulfo succinic esters such as sodium dioctylsulfosuccinate. Examples of non-ionic surfactants include products formed by condensing one or more alkylene oxides, such as ethylene oxide or propylene oxide with a relatively hydrophobic compound such as a fatty alcohol, fatty acid, sterol, a a fatty glyceride, a fatty amine, an arylamine, a fatty mercaptan, tall oil, etc. and also includes those produced by condensing one or more relatively lower alkyl alcohol amines (such as methanolamine, ethanolamine, propanolamine, etc.), with a fatty acid such as lauric acid, cetyl acid, tall oil, fatty acid, abietic acid, etc. to produce the corresponding amide. Other typical examples of these categories of surface active agents are described in Schwartz and Perry, "Surface Active Agents," Interscience Publishers, New York (1949), and Journal of American Oil Chemists Society, volume 34, No. 4, pages 170–216 (April 1957).

As illustrative of the stability of the compounds of this invention as compared to sodium dichloroisocyanurate, two grams of zinc di(dichloroisocyanurate) trihydrate, two grams of anhydrous zinc di(dichloroisocyanurate) and two grams of anhydrous sodium dichloroisocyanurate, respectively, in powder (−140, +200 mesh) crystalline form were mechanically mixed with 100 grams of a mixture consisting of 83.2 grams of silica, 7.5 grams of anhydrous sodium tripolyphosphate, 6.2 grams of anhydrous trisodium phosphate, 0.5 gram of anhydrous sodium sulfate and 2.6 grams of sodium dodecylbenzene sulfonate. The respective compositions were then placed in open wide-mouthed bottles, put in a humidity cabinet and exposed to a temperature of 90° F. at 85% relative humidity for 40 days. Upon removal of the respective mixtures the percentage loss of available chlorine in each case was found to be as follows:

|  | Percent |
| --- | --- |
| Sodium dichloroisocyanurate, anhydrous | 79 |
| Zinc di(dichloroisocyanurate) trihydrate | 22 |
| Zinc di(dichloroisocyanurate), anhydrous | 29 |

In a similar experiment, 2 grams of each of the three available chlorine compounds mentioned above were mechanically mixed with 100 grams of a mixture consisting of 45 grams of anhydrous sodium tripolyphosphate, 35 grams of anhydrous sodium sulfate, and 20 grams of anhydrous sodium carbonate. The respective compositions were then exposed to a temperature of 90° F. and a relative humidity of 85% for 30 days in the same manner as above described. Upon removal of the respective mixtures, the precentage loss of available chlorine in each case was found to be as follows:

|  | Percent |
| --- | --- |
| Sodium dichloroisocyanurate, anhydrous | 45 |
| Zinc di(dichloroisocyanurate) trihydrate | 18 |
| Zinc di(dichloroisocyanurate), anhydrous | 22 |

A similar improved stability with respect to that of sodium dichloroisocyanurate is also shown by the above mentioned zinc salts in various other formulations, thus, e.g. in a typical dry bleach formulation exposed to a temperature of 58° C. and 45% relative humidity, the respective available chlorine losses after 40 days were:

|  | Percent |
|---|---|
| Sodium dichloroisocyanurate, anhydrous | 65 |
| Zinc di(dichloroisocyanurate) trihydrate | 33 |
| Zinc di(dichloroisocyanuarte), anhydrous | 40 |

The outstanding stability of the compounds compared with metal dichlorocyanurates other than sodium dichlorocyanurate when used in conjunction with organic and inorganic materials is further demonstrated by the following examples.

EXAMPLE IV

A bleaching formulation containing 1% by weight of crystalline zinc di(dichloroisocyanurate) trihydrate, 28% by weight sodium tripolyphosphate, 5% by weight sodium metasilicate and 63% by weight of sodium sulfate and 3% by weight of sodium dodecyl benzene sulfonate were prepared by mechanically admixing the ingredients in a mechanical mixer. A similar formulation was prepared using 1% calcium di(dichlorocyanurate) instead of the 1% zinc salt, and another formulation was prepared in which 1% sodium dichlorocyanurate was used instead of the zinc di(dichlorocyanurate) trihydrate. The three formulations were analyzed for available chlorine content and placed in open vials in a humidity cabinet maintained at a temperature of 58°±1° C. and at a relative humidity of 75% and stored under these conditions for 40 days. After this time the samples were again analyzed for available chlorine. Losses of available chlorine content of the three chlorocyanurate formulations are set forth in the following table.

Table

| Formulation: | Loss of available chlorine after 40 days, percent |
|---|---|
| Zinc di(dichlorocyanurate) trihydrate | 28.0 |
| Calcium di(dichlorocyanurate) | 45.0 |
| Sodium dichlorocyanurate | 63.0 |

EXAMPLE V

A formulation containing 73.0% by weight of silica, 14.5% by weight of trisodium phosphate dodecahydrate, 7.5% by weight of anhydrous sodium tripolyphosphate, 3% by weight of sodium dodecyl benzene sulfonate and 2% by weight of zinc di(dichloroisocyanurate) trihydrate was prepared by mechanically admixing the ingredients in a mechanical mixer. A similar formulation was prepared in which the 2% zinc di(dichlorocyanurate) trihydrate was replaced by 2% amorphous anhydrous zinc di(dichlorocyanurate). Another formulation was prepared in which 2% magnesium di(dichlorocyanurate) hexahydrate was used in place of the zinc salt. Still another formulation was prepared in which sodium dichlorocyanurate replaced the zinc salt. The 4 formulations so prepared were analyzed for available chlorine content, were placed in open vials and stored in a humidity cabinet maintained at 32° C. and at 85% relative humidity for 30 days. After this time the samples were re-analyzed for available chlorine content. Losses in the available chlorine content of the 4 chlorocyanurate formulations are shown in the following table.

Table

| Formulation: | Loss of available chlorine after 30 days, percent |
|---|---|
| Zinc di(dichlorocyanurate) trihydrate | 8.0 |
| Amorphous zinc di(dichlorocyanurate), anhydrous | 12.0 |
| Magnesium di(dichlorocyanurate) hexahydrate | 26.0 |
| Sodium dichlorocyanurate | 26.0 |

The above zinc di(dichlorocyanurate) formulations are also useful as fungistatic agents either as dry powders or in the form of aqueous slurries, and this use will be described in greater detail hereinafter.

EXAMPLE VI

A formulation containing 81.3% by weight of silica, 7.5% by weight anhydrous sodium tripolyphosphate, 6.2% by weight anhydrous trisodium phosphate, 3% by weight of sodium dodecyl benzene sulfonate and 2% by weight of zinc di(dichlorocyanurate) trihydrate was prepared by mechanical admixing the ingredients in a mechanical mixer. Similar formulations were prepared, in one of which the 2% zinc di(dichlorocyanurate) trihydrate was replaced with 2% by weight of anhydrous amorphous zinc di(dichlorocyanurate); in another formulation 2% by weight of sodium dichlorocyanurate was employed in place of the zinc salt and 2% by weight of anhydrous magnesium di(dichloroisocyanurate) replaced the zinc salt in still another formulation. The four formulations were analyzed for available chlorine content, were placed in open vials and stored in a humidity cabinet maintained at a temperature of 32° C., and a relative humidity of 85% for 28 days. The samples were then re-analyzed for available chlorine. Losses in the available chlorine content of the four chlorocyanurate containing compositions are shown in the following table.

Table

| Formulation: | Loss of available chlorine after 28 days, percent |
|---|---|
| Zinc di(dichlorocyanurate) trihydrate | 6.0 |
| Zinc di(dichlorocyanurate), anhydrous | 8.0 |
| Sodium dichlorocyanurate | 32.0 |
| Magnesium di(dichlorocyanurate), anhydrous | 38.0 |

The above formulations containing the zinc chlorocyanurate compound like those in Example V are useful as bacteriostatic and fungistatic agents either as dry powders or in the form of aqueous solutions or slurries.

EXAMPLE VII

A formulation containing 45% by weigh tof anhydrous sodium tripolyphosphate, 33% by weight sodium sulfate, 20% by weight sodium carbonate and 2% by weight zinc di(dichloroisocyanurate) trihydrate was prepared by mechanically admixing the ingredients in a mechanical mixer. Similar formulations were prepared in one of which the 2% zinc di(dichlorocyanurate) trihydrate was replaced by 2% by weight of calcium di(dichlorocyanurate) anhydrous; in another 2% by weight of magnesium di(dichlorocyanurate) hexahydrate, replaced the zinc salt and 2% by weight of sodium dichlorocyanurate replaced the zinc salt in still another formulation. The four formulations so prepared were analyzed for avilable chlorine content, were placed in open vials and stored in a humidity cabinet maintained at a temperature of 32° C. and a relative humidity of 85% for 25 days. The formulations were then re-analyzed for available chlorine. Losses in available chlorine content of the four chlorocyanurate containing compositions are shown in the following table.

Table

| Formulation: | Loss of available chlorine after 25 days, percent |
|---|---|
| Zinc di(dichlorocyanurate) trihydrate | 9.0 |
| Calcium di(dichlorocyanurate), anhydrous | 20.0 |
| Magnesium di(dichlorocyanurate) hexahydrate | 32.0 |
| Sodium dichlorocyanurate | 32.0 |

The foregoing Examples IV through VII clearly show that zinc di(dichlorocyanurate) ether as the amorphous anhydrous salt or as the crystalline trihydrate salt is unexpectedly more stable toward loss of available chlorine under severe conditions of humidity and long storage periods than a variety of other chlorocyanurate salts in a wide range of formulations.

The anhydrous zinc di(dichlorocyanurate) and hydrates thereof are also surprisingly effective as bacteriostatic and fungistatic agents. It is well known in the art that certain chlorocyanurate compounds have sterilizing and disinfecting activity in relatively high concentrations, e.g. concentrations of from 1 to 30%, and resemble inorganic hypochlorites in this respect. Thus, both sodium and potassium dichlorocyanurate and certain inorganic hypochlorites, such as sodium and calcium hypochlorite have some disinfecting activity in concentrations of from 1% to 30%.

Higher chlorocyanurate concentrations, e.g. 10% to 30% are usually employed in highly infected or contaminated conditions or instances such as in sterilizing, sewage or in making swamp water potable. Lower concentrations, e.g. 1% to 10% are employed in food processing such as in sanitizing food containers or milk cans where a lower degree of contamination may exist. Surprisingly, however, zinc di(dichlorocyanurate) and hydrates thereof inhibit the growth of pathogenic micro-organisms such as *Staphylococcus aureus* and *Salmonella typhosa* in concentrations as low as 100 parts per million (0.01%) and effectively inhibits spore forming molds such as *Aspergillus niger* in concentrations as low as 1:1000 (0.1%). By way of contrast calcium di(dichlorocyanurate) or copper di(dichlorocyanurate) does not inhibit *Staphylococcus aureus* and *Salmonella typhosa* in concentrations of 1:1000 (0.1%) and showed no inhibition against molds of *Aspergillus niger*. Also, the compound zinc stearate, having about the same zinc content as zinc di(dichlorocyanurate) and hydrates thereof, does not inhibit the growth of any of the aforementioned microorganisms.

The following experiment illustrates the surprising bacteriostatic and fungistatic activity of zinc di(dichlorocyanurate).

EXAMPLE VIII

A stock solution containing 1% by weight of zinc di(dichlorocyanurate) trihydrate dissolved in 99 grams of water was prepared. Similar aqueous solutions containing 1% by weight of calcium di(dichlorocyanurate) copper di(dichlorocyanurate) and zinc stearate respectively were prepared.

Suspensions of the micro-organisms *Staphylococcus aureus*, 209, *Salmonella typhosa*, and *Aspergillus niger* (S.N. 111) were prepared as follows:

*Staphylococcus aureus*, 209: Ten milliliters of sterile distilled water were added to and agitated with a 24-hour agar slant stock culture of the micro-organism to provide a suspension containing at least $10^6$ organisms per ml.

*Salmonella typhosa* (Hopkins): Ten milliliters of sterile distilled water were added to and agitated with a 24-hour agar slant stock culture of the micro-organism to provide an aqueous suspension containing at least $10^6$ organisms per ml.

*Aspergillus niger* (S.N. 111): Ten milliliters of sterile distilled water were added to and agitated with a 6 day agar slant spore stock culture of the micro-organism to provide an aqueous suspension containing $10^6$ spores of the micro-organism per ml.

Bacteriostatic testing procedure: Two milliliters of the aforementioned 1% solution of zinc di(dichloroisocyanurate) were transferred to a tube containing 18 ml. of sterile, melted nutrient agar and the contents of the tube were thoroughly mixed by agitation. Two milliliters of this mixture were then transferred to a second tube containing 18 ml. of sterile, melted nutrient agar and mixed therewith. The mixture of the second tube was transferred, in like manner, to a third tube containing nutrient agar. By so proceeding there was prepared a series of three tubes containing respectively in serial, dilutions of 1:1,000; 1:10,000 and 1:100,000 of zinc di(dichlorocyanurate) trihydrate dissolved in nutrient agar. This procedure was repeated three times to provide 4 sets of three tubes containing zinc di(dichlorocyanurate) in the above mentioned serial concentrations.

The contents of the above tubes containing the nutrient agar and zinc di(dichlorocyanurate) were poured into separate petri dishes and allowed to harden. Two sets of petri dishes containing the zinc di(dichlorocyanurate) in same dilution were inoculated with 0.1 ml. of the aqueous suspension of *Staphylococcus aureus*, and the other two sets of petri dishes were inoculated with 0.1 ml. of the aqueous suspension of *Salmonella typhosa*. The petri dishes were then incubated at a temperature of 25° C. and examined after five days for the presence (+) or the absence (−) of growth.

No growth of organisms was apparent on the repilicate petri dishes containing zinc chloride concentrations of 1:1,000 and 1:10,000 zinc di(dichlorocyanurate) trihydrate. Growth was evident on the petri dishes containing a concentration of 1:100,000 (0.001%) zinc di(dichlorocyanurate) trihydrate. Inoculated nutrient agar (control) petri dishes which contained no zinc di(dichlorocyanurate) showed an abundant growth of the bacteria.

The above procedure was repeated in which the same concentrations of calcium di(dichlorocyanurate) and copper di(dichlorocyanurate) were tested. In no instance did these materials inhibt the growth of the bacteria at concentrations of 1:10,000. The results are presented in the table of this Example. Zinc stearate, also tested using the procedure as above described, did not inhibit bacterial growth at any concentration.

Fungistatic test: The procedure of the bacteriostatic test was substantially repeated except that Sabourand's agar was employed and each of the agar plates were inoculated with 0.1 ml. of the spore suspension of the mold *Aspergillus niger*. Substantially no inhibition of the growth of this micro-organism occurred except where the agar contained a concentration 1:1,000 zinc di(dichloroisocyanurate) trihydrate. These results are shown in the accompanying table.

| Compound | Highest Dilution Inhibiting | | |
|---|---|---|---|
| | *Staphylococcus aureus* | *Salmonella typhosa* | *Aspergillus niger* |
| Zn(Cl₂CYA)₂·3H₂O | 1:10,000 | 1:10,000 | 1:1,000 |
| Ca(Cl₂CYA)₂ | 1:1,000 | 1:1,000 | +* |
| Cu(Cl₂CYA)₂ | 1:1,000 | 1:1,000 | + |
| Zn Stearate | + | + | + |

*Note:* *+=growth at 1:1000 lowest dilution tested.

From the foregoing it will be apparent that the compounds of this invention may be used in a wide variety of circumstances when it is desired to prevent the growth of bacteria and fungi. Examples of such uses may be the preservation of post-harvest fruit against mold, the inhibition of bacterial and fungus growth in recirculating water systems the prevention of damage to grain plants such as oats and wheat, in preventing the growth of "rusts" and the like. It also will be apparent that quite different effects can be obtained by variously modifying the formulations to accommodate them to the method of application or use of bacteristatic and fungistatic formulations. Water soluble formulations, such as those described in earlier examples, may be suitable. On the other hand the compounds of this invention may be dispersed in an inert extender or carrier agent which may be water soluble or water insoluble.

In the instant specification it is to be understood that the term "dispersed" is used in its widest possible sense. That is to mean that particles of the compounds of this invention may be molecular and held in true solution during or immediately prior to use. It further means that the particles may be colloidal in size and may be distributed in a liquid phase in the form of suspensions or emulsions or in the form of particles held in suspension by wetting agents. The term "dispersed" also means that the particles may be mixed with and distributed throughout a solid carrier providing a mixture in particulate form, e.g. pellets, granules, powders, or dusts.

The compounds of this invention can be dispersed by suitable methods such as tumbling or grinding and the solid extending or carrier agents may be of either organic or inorganic nature, as previously described. Such solid materials include for example: tricalcium phosphate, calcium carbonate, kaolin, kieselguhr, talc, bentonite, fuller's earth, diatomaceous earth, calcined magnesia, powdered cork, powdered wood, and the like.

What is claimed is:
1. A compound selected from the group consiting of anhydrous zinc di(dichlorocyanurate) and hydrates thereof.
2. Anhydrous amorphous zinc di(dichlorocyanurate).
3. Crystalline zinc di(dichlorocyanurate) trihydrate.

References Cited by the Examiner

UNITED STATES PATENTS

| | | | |
|---|---|---|---|
| 2,171,901 | 9/39 | Wilson et al. | 260—248 X |
| 2,607,738 | 8/52 | Hardy | 252—99 |
| 2,682,541 | 6/54 | Kaiser | 260—248 |
| 2,741,606 | 4/56 | Holt et al. | 260—248 |
| 2,913,460 | 11/59 | Brown et al. | 260—248 |
| 3,002,931 | 10/61 | Symes | 252—99 |
| 3,035,054 | 5/62 | Symes et al. | 260—248 |
| 3,035,056 | 5/62 | Symes et al. | 260—248 |
| 3,035,057 | 5/62 | Symes et al. | 260—248 |
| 3,068,144 | 12/62 | Gilbert | 167—33 |
| 3,072,654 | 1/63 | Vazopolos | 260—248 |

FOREIGN PATENTS

| | | |
|---|---|---|
| 219,930 | 1/59 | Australia. |
| 628,984 | 10/61 | Canada. |
| 1,149,758 | 7/57 | France. |

OTHER REFERENCES

Chemical Abstracts, vol. 57, column 14, 285 (1962); abstract of Chenchikova et al., J. Microboil. Epidemoil. Immunioboil (U.S.S.R.), vol. 30, pages 95–100 (1959).

Chemical Abstracts, vol. 58, columns 1867–1868 (1963), abstract of Shere et al., App. Microboil., vol. 10, pages 538–541 (1962).

Claus et al.: J. Prakt. Chemie, vol. 146 (NF 38), *pages 208 to 225* (1888).

Kendall: General Chemistry, revised edition, page 584, D. Appleton-Century Co., N.Y. (1936).

Beilstein's Handbuch der Organischen Chemie, 4th ed., vol. 26, pages 239 to 243 (system No. 3889), Verlag von Julius Springer, Berlin, Germany (1937).

WALTER A. MODANCE, *Primary Examiner.*

JULIUS GREENWALD, JOHN D. RANDOLPH, *Examiners.*